(12) United States Patent
Mata et al.

(10) Patent No.: US 9,615,590 B2
(45) Date of Patent: Apr. 11, 2017

(54) METHOD OF FABRICATING A STEAK FROM SUBSCAPULARIS AND PRODUCT OBTAINED BY SUCH METHOD

(71) Applicants: Antonio Mata, North Richland Hills, TX (US); THE BOARD OF REGENTS FOR OKLAHOMA STATE UNIVERSITY, Stillwater, OK (US)

(72) Inventors: Antonio Mata, North Richland Hills, TX (US); Jacob Lee Nelson, Stillwater, OK (US)

(73) Assignee: The Board Of Regents For Oklahoma State University, Stillwater, OK (US)

( * ) Notice: Subject to any disclaimer, the term of this patent is extended or adjusted under 35 U.S.C. 154(b) by 245 days.

(21) Appl. No.: 14/348,743

(22) PCT Filed: Sep. 19, 2012

(86) PCT No.: PCT/US2012/056063
§ 371 (c)(1),
(2) Date: Mar. 31, 2014

(87) PCT Pub. No.: WO2013/048839
PCT Pub. Date: Apr. 4, 2013

(65) Prior Publication Data
US 2014/0287133 A1    Sep. 25, 2014

Related U.S. Application Data

(60) Provisional application No. 61/540,937, filed on Sep. 29, 2011.

(51) Int. Cl.
*A22C 17/00* (2006.01)
*A23L 13/00* (2016.01)

(52) U.S. Cl.
CPC ............ *A22C 17/002* (2013.01); *A23L 13/00* (2016.08)

(58) Field of Classification Search
CPC .......... A23L 1/31; A23L 13/00; A22C 17/002
USPC .................................. 426/645; 452/134, 148
See application file for complete search history.

(56) References Cited

U.S. PATENT DOCUMENTS

| | | |
|---|---|---|
| 4,337,551 A | 7/1982 | Weinhaus |
| 6,280,311 B1 | 8/2001 | Kuck |
| 2007/0264920 A1 | 11/2007 | Lobel |
| 2010/0040760 A1 | 2/2010 | Lobel et al. |

OTHER PUBLICATIONS

"Adding Value Increasing Profit", Oct. 2010, Publisher: EBLEX Trade Marketing Initiative, Published in: UK.
Calkins, et al., "Ranking of Beef Muscles for Tenderness", 2007, Publisher: Cattlemen's Beef Board, Published in: US.
(Continued)

*Primary Examiner* — Vera Stulii
(74) *Attorney, Agent, or Firm* — Fellers, Snider, Blankenship, Bailey & Tippens, P.C.; Terry L. Watt

(57) ABSTRACT

This disclosure relates to a system and method for preparing and offering to the marketplace a muscle cut from a carcass for use as a steak. In particular, the Subscapularis muscle may be utilized according to the instant invention as a high-end cut of meat. In an embodiment, a Subscapularis muscle will be processed into a steak via a prescribed series of cuts. The steak will, in some embodiments, be further processed by trimming fat and connective tissue as is taught herein.

6 Claims, 7 Drawing Sheets

(56) References Cited

OTHER PUBLICATIONS

"EBLEX Increase Your Steak Range" Publisher: EBLEX, Published in: UK.
"Food Trader for Butchers", Jan. 2009, Publisher: The National Federation of Meat and Food Traders, Published in: US.
"Latest News From the NBA", Mar. 16, 2010, Publisher: National Beef Association, Published in: UK.
"Manual De Carnes Bovina Y Ovina", Feb. 1, 2010, Publisher: www.inac.gubh.uy/innovaportal/fi, Published in: Uruguay.
"Osterreichisches Lebensmittelbuch", Feb. 1, 2010, Publisher: Internet URL:http://www.bmg.gy.at/cms/home/attachments.
PCT/US2012/056063, The Board of Regents for Oklahoma State University, International Search Report and Written Opinion dated Dec. 7, 2012.

METHOD OF FABRICATING A STEAK FROM SUBSCAPULARIS AND PRODUCT OBTAINED BY SUCH METHOD

CROSS REFERENCE TO RELATED APPLICATION

This application claims the benefit of U.S. Provisional Application No. 61/540,937 filed Sep. 29, 2011, and herein incorporated by reference in its entirety for all purposes.

FIELD OF THE INVENTION

This disclosure is related to the field of meat cutting in general and, more particularly, to obtaining quality cuts of meat from an underutilized portion of a carcass.

BACKGROUND OF THE INVENTION

Subscapularis is a muscle from the bovine carcass with a triangular shape in situ. It may have a rectilinear appearance when removed from the carcass. Anatomically, the Subscapularis fills the subscapular fossa and inserts into the lesser tubercle of the humerus and the front of the capsule of the shoulder joint. Subscapularis muscle is known to be one of the more tender muscles in a typical bovine carcass. However, this muscle is underutilized as a premium cut because of fabrication difficulties. This muscle has a complex internal and external connective tissue system that runs through the lean portion and there is no known method of fabricating it effectively (in terms of labor, yield, shape, etc.) into steak. Current beef carcass fabrication is such that this muscle could end up in as many as four sub-primals: (a) the beef chuck roll, (b) the beef rib, (c) beef short ribs, and (d) beef chuck flap. Typically, portions of the Subscapularis are trimmed off and are allocated as meat for grinding. As the sub-primals are trimmed, the remaining pieces of the lean muscle may be allocated to ground meat.

The beef Subscapularis is comparable in shear force (a metric of steak tenderness) to the beef Flat Iron steak (Infraspinatus) and is significantly more tender than the beef Petite Tender steak (Teres major). The Subscapularis weighs approximately 700 g-1100 grams (1.5-2.5 pounds) whole and untrimmed, and approximately 700 g-800 grams (1.5-1.8 pounds) (trimmed).

Consequently, the common practice has been to grind this particular muscle into ground beef. However, there is a substantial economic incentive to fabricate it into a steak. For example, as of date Jun. 27, 2012 the value of this muscle as ground beef is approximately $3.3-$3.7 per kg ($1.5-$1.7 per pound). By way of comparison, this same muscle might bring $7.7 to $8.3 per kg ($3.5 to $3.8 per pound) (based on beef Petite Tender prices) if it could be produced as a steak.

Heretofore, as is well known in the meat preparation arts, there has not been a method for effective and reliable fabrication of steak from a Subscapularis muscle. Accordingly, it should now be recognized, there exists, and has existed for some time, a very real need for a method of meat preparation that would address and solve the above-described problems.

Before proceeding to a description of the present invention, however, it should be noted that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

There is provided herein a system and method for preparing a muscle cut from a bovine carcass for use as a steak. In particular, the Subscapularis muscle may be utilized according to the instant invention as a high-end cut of meat. In an embodiment, a Subscapularis muscle will be processed into a steak via a prescribed series of cuts. The resulting steak will, in some embodiments, be further processed by trimming lean tissue, fat tissue and connective tissue as is taught herein.

There is taught herein a method of preparing a cut of meat, wherein is provided at least a portion of a Subscapularis muscle having some amount of lean tissue, fat tissue, and connective tissue, wherein said at least a portion of said Subscapularis muscle has a cranial side, a caudal side, a ventral end, a dorsal end, a medial surface and a lateral surface, comprising the steps of: trimming from said cranial side, said caudal side, said ventral end, said dorsal end said medial surface and said lateral surface at least a portion of said lean tissue, said fat tissue, and said connective tissue, thereby preparing said cut of meat.

According to another aspect of the instant invention, there is taught herein a method of preparing a cut of meat, wherein is provided at least a portion of a Subscapularis muscle having some amount of lean tissue, fat tissue, and connective tissue, wherein said at least a portion of said Subscapularis muscle has a cranial side, a caudal side, a ventral end, a dorsal end, a medial surface and a lateral surface, comprising the steps of: trimming from said cranial side, said caudal side, said medial surface and said lateral surface at least a portion of said lean tissue, said fat tissue, and said connective tissue from said at least a portion of said Subscapularis muscle, thereby preparing said cut of meat.

According to still another aspect of the invention, there is taught a method of preparing a cut of meat, wherein is provided at least a portion of a Subscapularis muscle, and wherein said at least a portion of said Subscapularis muscle has a cranial side, a caudal side, a ventral end, a dorsal end, a medial surface, and a lateral surface, comprising the steps of: making a longitudinal cut of said at least a portion of said Subscapularis muscle from said ventral end to said dorsal end proximate to an edge of said cranial side, at least a portion of said longitudinal cut being at least approximately parallel to a caudal side edge of said at least a portion of said Subscapularis muscle; making a cut from said dorsal end into said at least a portion of said Subscapularis muscle until a prominent white fissure is at least approximately reached; and, making a cut from proximate to said prominent white fissure to said caudal side, wherein said cut from proximate to said prominent white fissure is chosen to said caudal side is oriented so as to sever said prominent white fissure from said at least a portion of said Subscapularis muscle, thereby forming said cut of meat.

According to a further aspect of the instant invention, there is taught herein a method of preparing a cut of meat, wherein is provided at least a portion of a Subscapularis muscle, and wherein said at least a portion of said Subscapularis muscle has a cranial side, a caudal side, a ventral end, a dorsal end, a medial surface, and a lateral surface, comprising the steps of: making a longitudinal cut of said at least a portion of said Subscapularis muscle from said ventral end to said dorsal end proximate to an edge of said cranial side, at least a portion of said longitudinal cut being at least approximately parallel to a caudal side edge of said at least a portion of said Subscapularis muscle; making a cut from said dorsal end into said at least a portion of said Subscapularis muscle until a prominent white fissure is at least approximately reached; and, making a cut from proximate to said prominent white fissure to said ventral end, thereby forming said cut of meat.

Finally, there is provided herein still another method of preparing a cut of meat, wherein is provided at least a portion of a Subscapularis muscle, and wherein said at least a portion of said Subscapularis muscle has a cranial side, a caudal side, a ventral end, a dorsal end, a medial surface, and a lateral surface, comprising the steps of: making a longitudinal cut of said at least a portion of said Subscapularis muscle from said ventral end to said dorsal end proximate to an edge of said cranial side, at least a portion of said longitudinal cut being at least approximately parallel to a caudal side edge of said at least a portion of said Subscapularis muscle; making a cut proximate to said ventral end that is roughly perpendicular to said longitudinal cut of step (a); making a cut from said dorsal end into said at least a portion of said Subscapularis muscle until a prominent white fissure is at least approximately reached; and, making a cut from proximate to said prominent white fissure to at least said cut that is proximate to said ventral end and that is roughly perpendicular to said longitudinal cut of step (a), thereby forming said cut of meat.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 7 contains outlines of some exemplary final products produced according to the approaches of FIGS. 2, 3, and 4.

DETAILED DESCRIPTION

Figure 1:
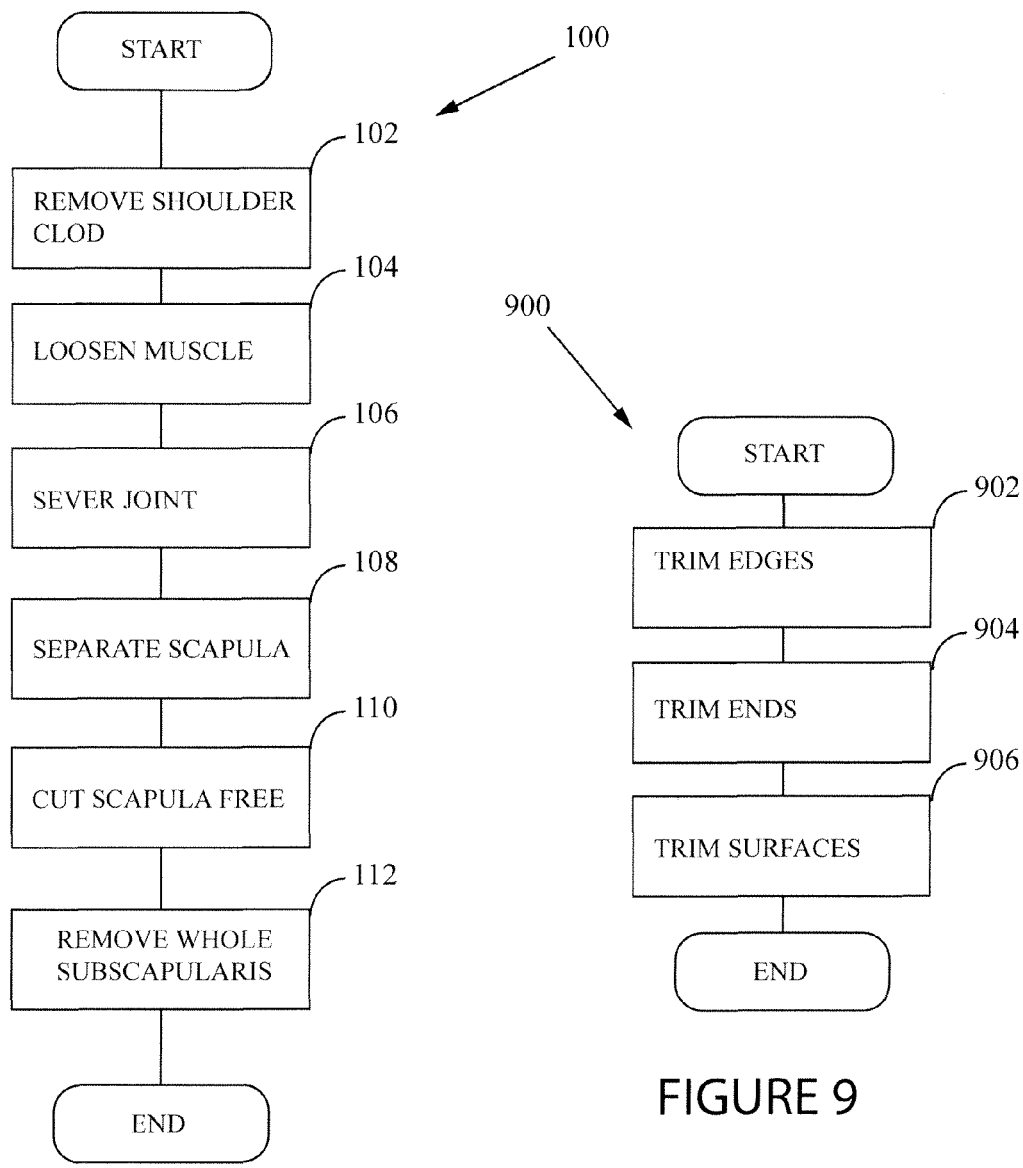
FIG. 1 is a flow chart illustrating one possible procedure for obtaining the Subscapularis muscle from a beef carcass according to the present disclosure.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

An embodiment of the instant invention relates to a process for preparing, and offering to the marketplace, a muscle cut from a bovine (e.g., beef or bison) carcass for use as a steak. In particular, the Subscapularis muscles may be utilized as a high-end cut of meat according to methods of the present disclosure. The Subscapularis is a muscle from a bovine carcass with a triangular shape in situ. It may have a rectilinear appearance when removed from the carcass. Anatomically, the Subscapularis fills the Subscapular Fossa and inserts into the lesser tubercle of the humerus and the front of the capsule of the shoulder joint.

A common practice is to grind this particular muscle for use as a food product. The present process offers and makes available a new item in the bovine industry food service and retail sectors, comprising the Subscapularis muscle prepared in accordance with the methods of the present disclosure. The result will be additional raw materials available to users of bovine muscle cuts. Furthermore, incremental positive value will be realized to bovine cutout values.

The present process offers and makes available a new item in the bovine food service industry and retail sectors, comprising the Subscapularis muscle 200 prepared in accordance with the methods of the present disclosure. The result will be additional raw materials available to users of bovine muscle cuts. Furthermore, incremental positive value will be realized to bovine cutout values. Current beef carcass fabrication is such that the Subscapularis muscle may end up in as many as four wholesale cuts: (a) the beef chuck roll, (b) the beef rib, (c) beef short ribs, and (d) beef chuck flap. Portions of it also are trimmed off and go directly to grinding material. As the subprimals are trimmed, the remaining pieces of the muscle are allocated to ground beef. According to the present disclosure, practical procedures have been developed that result in a steak of uniform shape and good visual appeal. Upon cooking, the steak resembles the so-called beef New York strip. These procedures encompass cutting/trimming/portioning steps.

The procedures developed herein are compatible with existing industry practices (e.g., knives, hooks, skinners, etc.).

Presently, the Subscapularis 200 is not utilized as a value-added cut by the industry. Any caution that might be currently exercised during its removal would be only as a means to maximize carcass products yield, rather than protect product integrity for final processing and appearances. Although damage occurs, it is by default rather than design, and the damage currently does not negatively affect the use of the muscle in ground meat or roast forms. However, in the present embodiment of the current new product, muscle integrity is essential in order to utilize the preparation process that has been developed. Recommended harvesting procedures are as follows:

Referring now to FIG. 1, this figure contains a flow chart that illustrates one possible procedure 100 for obtaining the Subscapularis 200 from a bovine carcass and, by way of example only, from a beef carcass according to the present disclosure. At step 102, the beef shoulder clod is removed from the carcass, according to methods well known to one of ordinary skill in the art. At step 104, a knife or hook may be used to loosen the muscle and connective tissue connections between the Subscapularis and the medial side of the scapula. At step 106, the joint between the humerus and scapula is severed. At step 108, the scapula is separated from the Subscapularis. In one embodiment, the scapula is grasped just beneath the joint with the humerus and pulled downward (step 110). A mechanical puller may be used at this step. At step 112, the Subscapularis 200 may be removed from the carcass (or chuck roll) with the use of a knife following the natural seam between the Subscapularis 200 and the carcass.

Final preparation of the steak product from the Subscapularis 200 obtained as described above, or according to another suitable method, may be performed by hand or machine. In some instances, the cranial and caudal edges of the Subscapularis 200 may be trimmed resulting in a uniform shape of meat versus the uncut Subscapularis 200. Additionally, in some embodiments the dorsal and ventral ends may also be trimmed. Finally, the remaining outer surface of the Subscapularis 200 may be trimmed or removed to reduce the amount of tough connective tissue remaining. The result is a largely homogenous and connective tissue-free cut of meat, similar in quality to the so-called New York strip steak. It is understood that trimming of the cranial and caudal edges, the dorsal and ventral ends, and the medial 405 and lateral 505 surfaces may be accomplished in a different order. The removal of connective tissue on the medial 405 and lateral 505 surfaces may be accomplished by known meat cutting practices (e.g., hand-held knives, mechanical skinner, or other implements).

Figure 9:
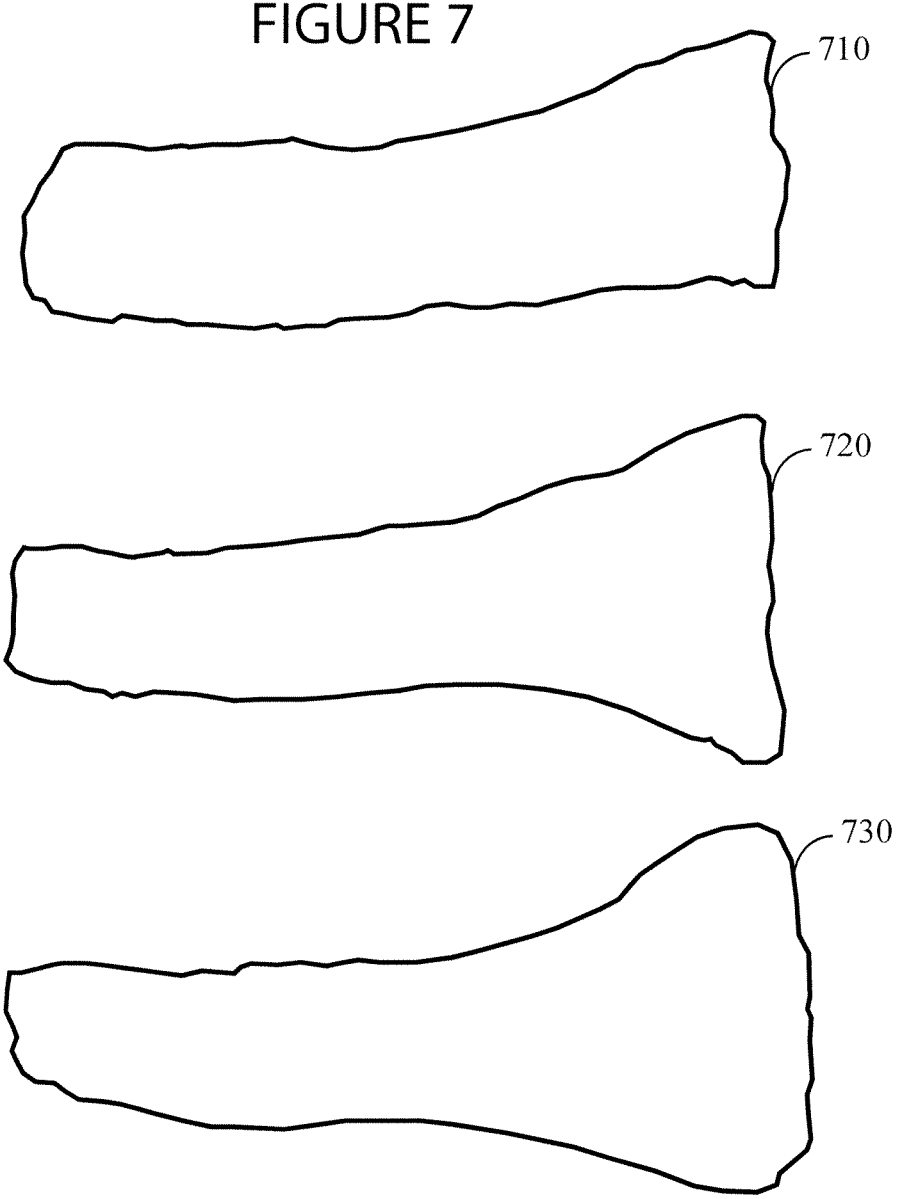
FIG. 9 is a flow chart illustrating a method of converting the Subscapularis muscle into a steak cut according to aspects of the present disclosure.

The process described above may be generally summarized with reference to the flow chart 900 of FIG. 9, although it is understood that the finishing steps need not necessarily be completed in the order shown. Edges are trimmed at step 902, followed by trimming of the ends at step 904, and trimming of the sides at step 906. It is understood that this finishing process may be accomplished manually, with machine assistance, or some combination of the two. In other embodiments, portions of the process could be automated.

Figure 5:
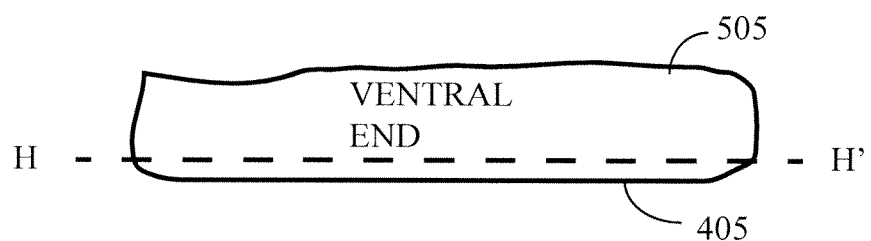
FIG. 5 contains an end view of the ventral or dorsal end of the Subscapularis muscle 200 and a preferred plane along which a cut might be made in an embodiment of the instant invention.
Figure 6:
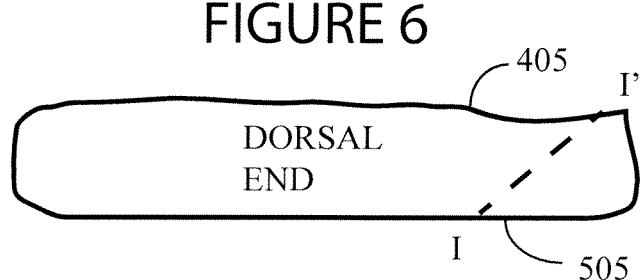
FIG. 6 contains an end view of dorsal end of the Subscapularis muscle 200 and a preferred diagonal plane along which a cut might be made in an embodiment of the instant invention.

In FIGS. 5 and 6, which represent the surface of the ventral and dorsal ends, respectively, a cut prepared as described above is shown. Here the resemblance to the so-called New York Strip steak can be better appreciated. Therefore, the present disclosure has illustrated various methods by which a previously underutilized portion of a bovine or other carcass, normally ground or otherwise used as a part of another sub-primal cut, may be recovered and utilized as a value-added cut of meat, suitable for preparation and serving in a similar fashion to traditional steak cuts such as the so-called New York Strip steak.

Figure 2:
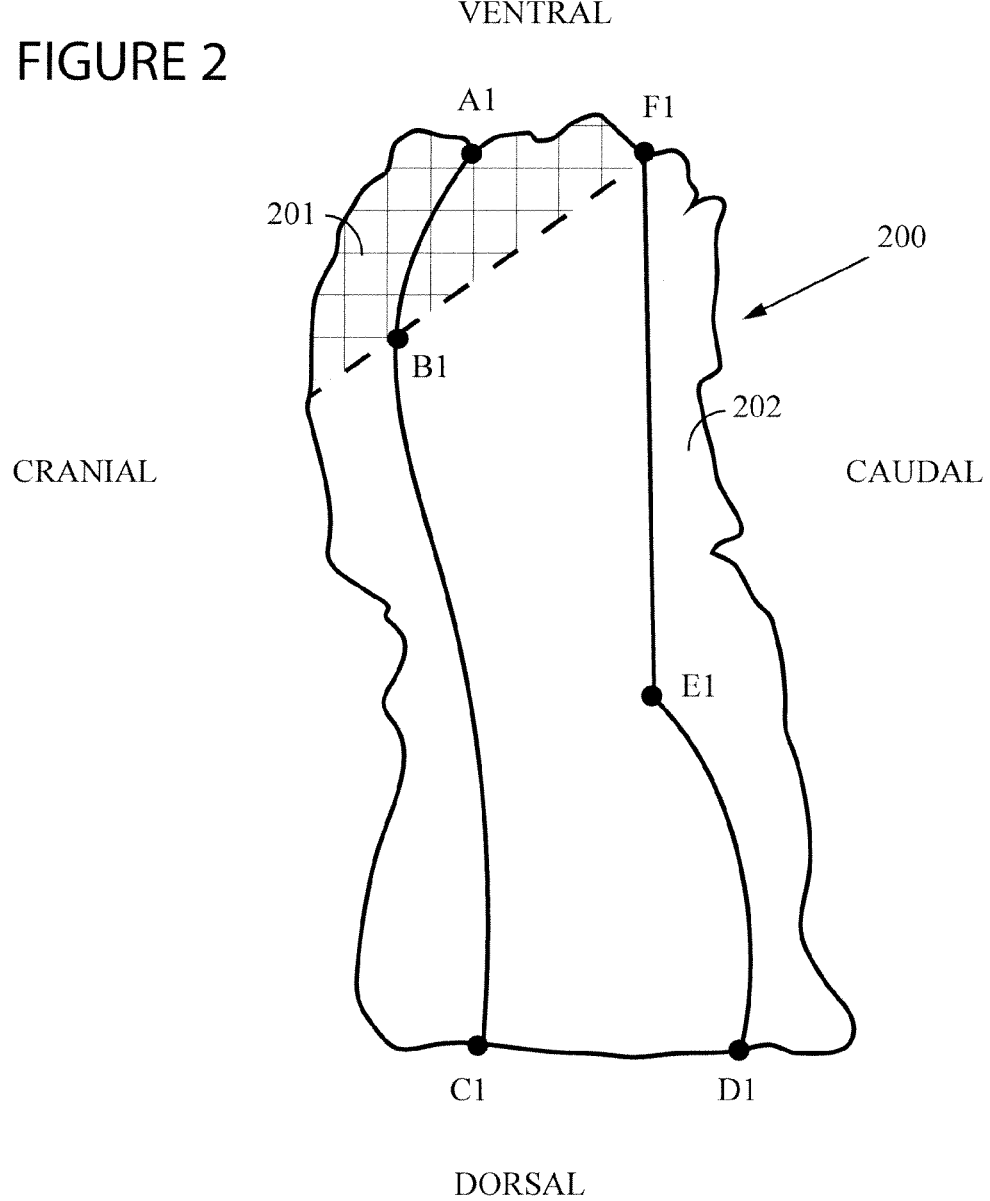
FIG. 2 illustrates a series of cuts that could be applied to a Subscapularis muscle 200 in order to produce a steak according to first embodiment of the instant invention. The cranial portion of the Subscapularis muscle 200 near the ventral end is removed during fabrication and is termed the Subscapularis accessorius A 201. A caudal portion of the Subscapularis muscle 200 is removed during fabrication and is termed as Subscapularis accessorius B 202.

Turning next to some exemplary approaches to obtaining the instant steak product from a Subscapularis muscle 200, as illustrated in FIG. 2 and as a first preferred step, a cut A1 to B1 will be made to at least partially separate the Subscapularis accessorius A 201 (which is schematically represented by the cross-hatched region of the figures) and associated fat from the cranial edge/ventral edge of the medial 405 surface. In some embodiments, this portion of the meat will be, initially, left attached. Next, in this embodiment, a cut A1-C1 will be made along the long axis of the muscle proximate to the cranial edge and generally parallel to the caudal edge.

Preferably, the cut will be such as to leave about a 0.6 cm (0.25 inches) thickness at the cranial edge of the muscle. Note that, in some instances the dorsal end of the muscle will be thinner than the ventral end.

Next, in an embodiment a horizontal planar cut will be made along at least a portion of the upper (medial) surface of the remaining portion of the Subscapularis muscle 200 to remove the surface fat and thereby expose the silver colored connective tissue that lies underneath. A seam will next be located at the dorsal end to expose and cut along a prominent white colored fissure around position D1. Note that, the white fissure will be found in the caudal/dorsal region of the Subscapularis.

Next, and preferably, a cut D1-E1 will be made that at least approximately follows the seam to begin the separation of the lean meat (steak component), leaving attached the prominent white fissure to what will become trim (i.e., Subscapularis accessorius B 202). Note should be taken in this embodiment of the groove within the silver colored connective tissue that runs throughout the caudal edge. The cut should be continued roughly following the seam that separates the main body of Subscapularis 200 from the prominent white fissure. The cut will typically exit at approximately a 45° angle to the working surface as it nears its terminus at E1.

Next, in this embodiment at the ventral end of the prominent white fissure E1, a cut will be made at an angle (e.g., at approximately a 90° angle) to the working surface beginning at E1 along the long axis of the muscle toward the ventral end at F1. Preferably, the cut will be approximately parallel to the long axis of the muscle and along the groove of the silver colored connective tissue.

Figure 10:
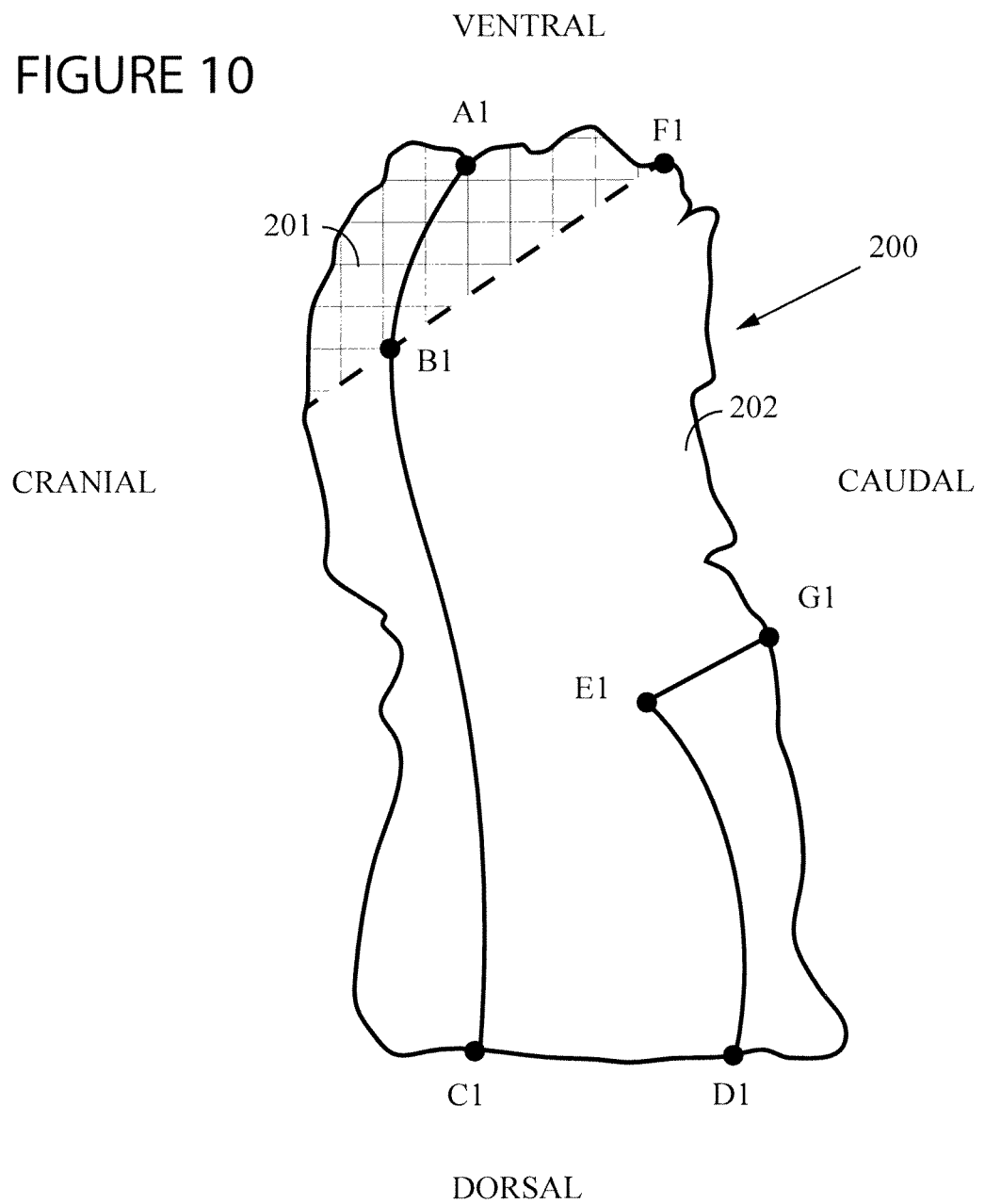
FIG. 10 illustrates another embodiment of the invention where the fissure and associated connective tissue are separated from the caudal/dorsal corner of the Subscapularis muscle 200.

Continuing with the present example, note that an alternative to the D1-E1-F1 cut would be to use the cuts illustrated in the embodiment of FIG. 10, wherein the D1-E1-F1 cut is replaced by the cut D1-E1-G1 which is sufficient to separate the prominent white fissure and associated connective tissue from the Subscapularis but leaves the Subscapularis accessories B largely attached to the resultant steak. Although such may not be optimal from the standpoint of the ultimate consumer, in some cases it might be preferable to manufacture the steak of the instant invention in this manner.

Next, the connective tissue periosteum can be removed from the surface of the muscle that was originally attached to the scapula. In the embodiment of FIG. 5, for purposes of convenience when this cut H-H' is made manually the remaining Subscapularis 200 muscle will be oriented such that the medial surface 405 with the prominent connective tissue is against the cutting table. Then, a cut H-H' that is proximate to the now lower surface of the Subscapularis 200 and approximately parallel thereto will preferably be made along its entire length. This will remove the silver colored connective tissue from the medial 405 face of the Subscapularis 200 along with some amount of lean tissue, which cut will typically amount to about 0.6 cm (0.25 inches) from the entirety of its lower surface in FIG. 5. Those of ordinary skill in the art will recognize that this cut H-H' could readily be performed with tools customarily used in the trade.

Figure 4:
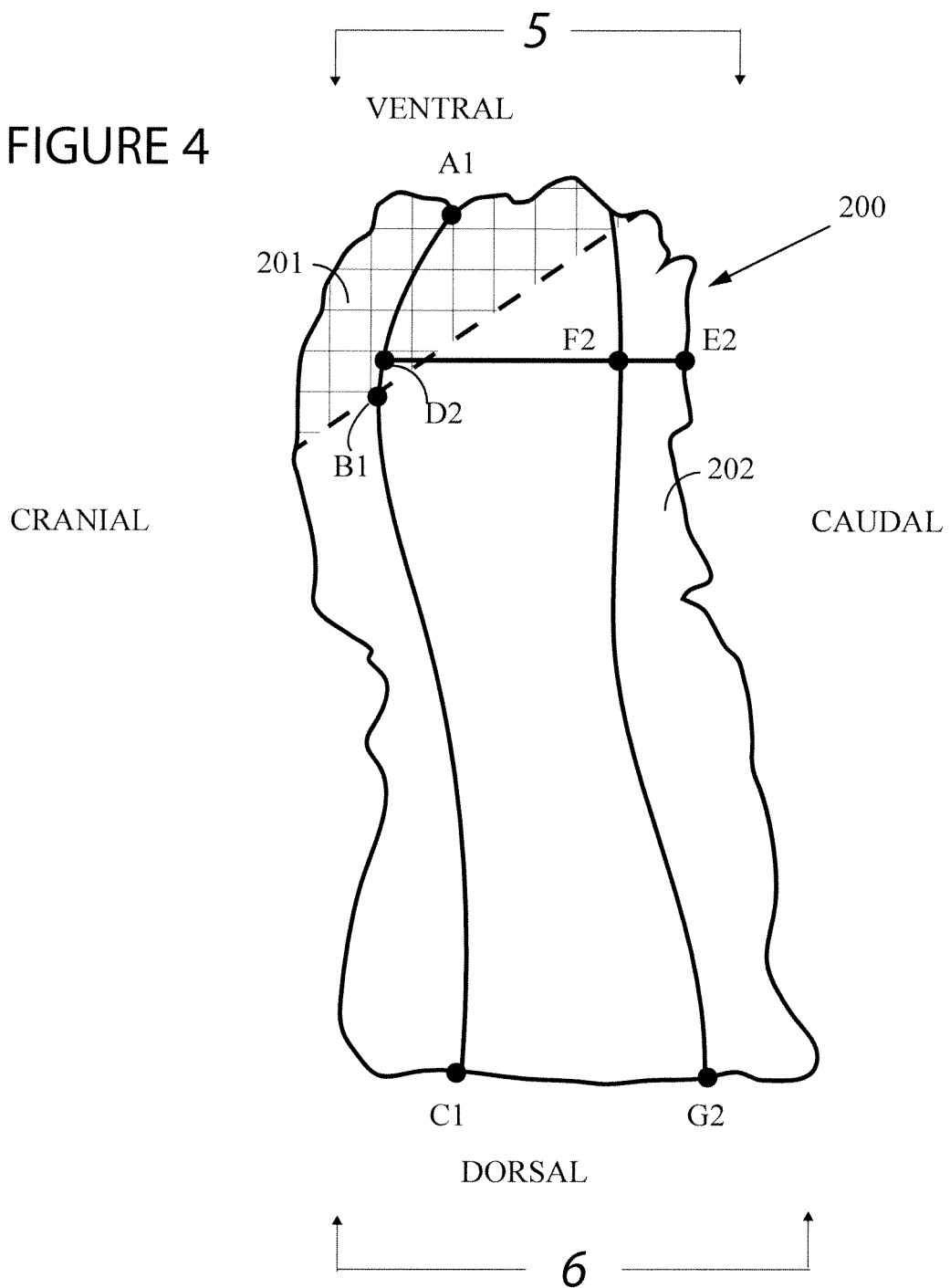
FIG. 4 illustrates a series of cuts that could be applied to a Subscapularis muscle in order to produce a steak according to a third embodiment of the instant invention.

Next and as is generally indicated in FIG. 4, there is provided another method of extracting steak from a Subscapularis 200 muscle. In this approach, the steak can be fabricated using only three cuts. The first cut A1-B1-C1 will be made using the approach and the markers described in the embodiment of FIG. 2 supra. The cut D2-F2-E2 is made primarily to square off the ventral end of the muscle and will typically be approximately orthogonal to the A1-B1-C1 cut at D2. That being said, those of ordinary skill in the art will recognize that this cut could be made at almost any angle to the A1-B1-C1 cut so long as it is aimed generally toward the caudal side (or even caudal/ventral corner). The cut G2-F2 will preferably follow the groove of prominent connective tissue on the caudal edge of the muscle as has been described previously and will terminate proximate to the D2-E2 cut or proximate to the ventral end of the Subscapularis 200 muscle. Finally, in most instances the cut of FIG. 5 will be necessary to remove the silver colored connective tissue from the steak. That is, the fat and connective tissue (together with some lean tissue) will preferably be removed from the medial 405 surface of the Subscapularis muscle 200 as has been described previously.

Next, and preferably, a diagonal cut I-I' will be made (FIG. 6) along the seam that separates the main body of the Subscapularis muscle 200 from the prominent white fissure. This cut eliminates the fissure and remaining Subscapularis accessorius B 202 from the steak. Finally, the remaining steps in this approach will mirror those discussed above in connection with the embodiment of FIG. 2.

Figure 3:
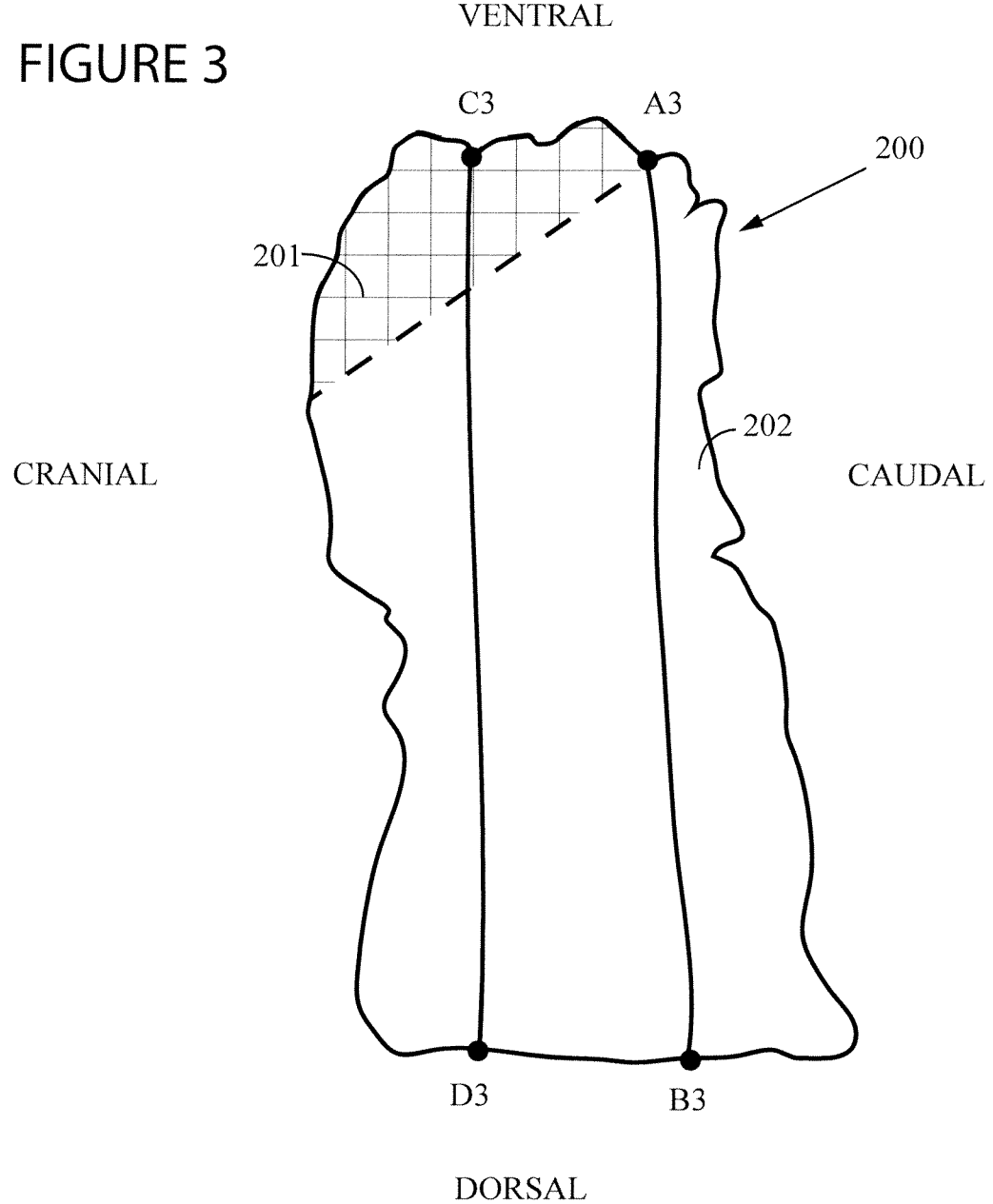
FIG. 3 illustrates a series of cuts that could be applied to a Subscapularis muscle 200 in order to produce a steak according to second embodiment of the instant invention.

Finally, FIG. 3 illustrates still another approach to producing a steak from the Subscapularis muscle 200. Broadly speaking, the strategy in this case is to remove, prior to any trimming, the entire connective tissue on the medial 405 surface along with the associated surface fat as well as the Subscapularis accessorius A 201. Of course, those of ordinary skill in the art will understand that it is virtually unavoidable that some amount of lean tissue will necessarily be taken as well in this operation. As a first preferred step, the Subscapularis muscle 200 will be placed with its medial 405 surface against the surface of the cutting table. See, for example, the orientation of FIG. 5. Next, and preferably, a cut will be made parallel to the cutting table (FIG. 5) and at a height above it sufficient to remove the lean tissue, connective tissue, surface fat, etc., from the muscle. Approximately 0.6 cm (0.25 inches) may be removed from the muscle in some cases. Obviously, this cut might be made by using an automated skinner or other automated means.

Next, two long cuts (A3-B3 and C3-D3) will be made in the Subscapularis muscle 200. Preferably, the first cut will be made on the cranial side (C3-D3) in such a way as to leave about 0.6 cm (0.25 inches) thickness on the cranial edge. For the second cut, the natural groove that is present near the caudal edge should be followed.

Those of ordinary skill in the art will recognize that the two longitudinal cuts of the previous embodiments, in actuality, only need to be roughly parallel to each other and sufficiently spaced apart from the caudal side to remove the fissure and connective tissue from the steak product.

Figure 8:
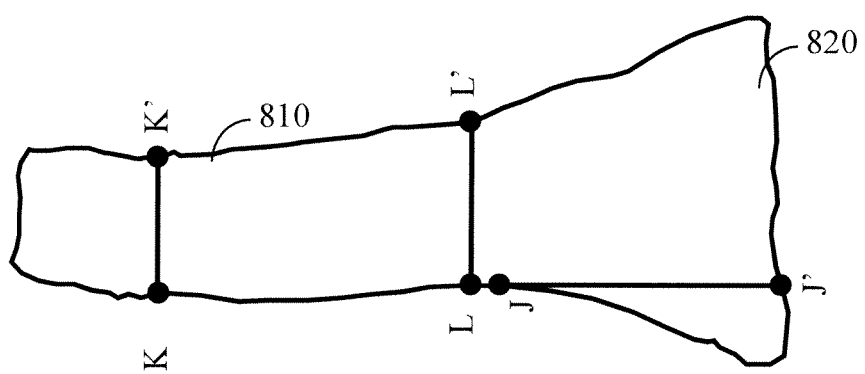
FIG. 8 illustrates some subdivisions that might be made of an exemplary final product that was produced according to the instant invention.

Finally, FIG. 7 contains some exemplary outlines of the steak that might be produced according to the methods of FIGS. 2, 3 and 4. Cuts of meat 710, 720, and 730 represent in a general way the shapes of the steak that might be produced using the methods of FIGS. 2, 3, and 4, respectively. Those of ordinary skill in the art will recognize that the steaks of FIG. 8 might be gleaned from cuts 710, 720, and. 730 to create smaller portions by, for example, making the further cuts illustrated in FIG. 8. For example, the cut J-J' might be used to create a strip-type steak. If cuts K-K' and L-L' are made instead, two steaks 810 and 820 would be produced. Obviously, many other configurations are possible and may readily be devised by those of ordinary skill in the art.

Note that in the embodiments discussed herein, the order of cuts is not important. That being said, it should be appreciated that the suggested order may be more efficient in some instances.

Further note that when the terms medial surface 405 and lateral surface 505 are used herein, those terms refer to side of the Subscapularis muscle 200 that face, respectively, away from and toward the scapula from which that muscle was removed.

Still further, it should be noted that when the instant disclosure indicates that a cut is from the dorsal end to the ventral end of the Subscapularis muscle 200 is to be made; those terms should be broadly construed to include instances where multiple cuts are used. These terms should further be interpreted to refer to the then-current dorsal end and/or ventral end. That is, if the Subscapularis muscle 200 has been truncated on either end for any reason (e.g., if the muscle has been "squared off"), the truncated end(s) will be considered either dorsal or ventral end for purposes of the instant disclosure.

Even further, those of ordinary skill in the art will recognize that in some instances a meat packer might extract a steak from a Subscapularis muscle without removing the surface fat and connective tissue (e.g., the cut discussed in connection with FIG. 5). Such an approach might be desirable where the steak is packaged and sent to a different facility for finishing.

It will be appreciated that due to difference in the size of the bovine carcass, variations in anatomy, the amount of trimming required, the skill of the butcher, and other factors that the final size, weight and appearance of the steak cut rendered according to methods disclosed herein may vary across a range. In instances where the instant steak is obtained from a beef carcass, the final precooking weight of the product may vary from about 240 grams to 340 grams (8.5 oz. to 12.0 oz.) with an average of 270 grams (9.5 oz.). The length may vary from about 22 cm to 24 cm (8.5 inches to 9.3 inches) with an average of 23 cm (9.0 inches). The width may range from about 7.0 cm to 8.0 cm (2.8 inches to 3.3 inches) with an average of 8.0 cm (3 inches). Finally, the thickness may range from about 1.0 cm to 1.5 cm (0.5 inches to 0.6 inches) with an average of 1.3 cm (0.5 inches). Obviously, such ranges are given for purpose of illustration only and not out of any intent to limit the scope of the instant invention or the claims that follow.

Finally, it should be noted and remembered that the methods taught herein could be applied to meat animal species other than cattle, bison, etc. Those of ordinary skill in the art will understand how the inventive methods could be adapted to create a steak from the Subscapularis muscle of, by way of example only, swine, deer, moose, antelope, etc.

* * *

Thus, the present invention is well adapted to carry out the objectives and attains the ends and advantages mentioned above as well as those inherent therein.

While the invention has been described and illustrated herein with reference to certain embodiments in relation to the accompanying drawings, various changes and further modifications may be made therein by those skilled in the art without departing from the spirit of the invention, the scope of which is determined from the appended claims.

What is claimed is:

1. A method of preparing a cut of meat, wherein is provided at least a portion of a Subscapularis muscle, and wherein said at least a portion of said Subscapularis muscle has a cranial side, a caudal side, a ventral end, a dorsal end, a medial surface, and a lateral surface, comprising the steps of:
   a. making a longitudinal cut of said at least a portion of said Subscapularis muscle from said ventral end to said dorsal end proximate to an edge of said cranial side, at least a portion of said longitudinal cut being at least approximately parallel to a caudal side edge of said at least a portion of said Subscapularis muscle;
   b. making a cut from said dorsal end into said at least a portion of said Subscapularis muscle until a prominent white fissure is at least approximately reached; and,
   c. making a cut from proximate to said prominent white fissure to said caudal side, wherein said cut from proximate to said prominent white fissure is chosen to said caudal side is oriented so as to sever said prominent white fissure from said at least a portion of said Subscapularis muscle, thereby forming said cut of meat.

2. A method of preparing a cut of meat, wherein is provided at least a portion of a Subscapularis muscle, and wherein said at least a portion of said Subscapularis muscle has a cranial side, a caudal side, a ventral end, a dorsal end, a medial surface, and a lateral surface, comprising the steps of:
   a. making a longitudinal cut of said at least a portion of said Subscapularis muscle from said ventral end to said dorsal end proximate to an edge of said cranial side, at least a portion of said longitudinal cut being at least approximately parallel to a caudal side edge of said at least a portion of said Subscapularis muscle;
   b. making a cut from said dorsal end into said at least a portion of said Subscapularis muscle until a prominent white fissure is at least approximately reached; and,
   c. making a cut from proximate to said prominent white fissure to said ventral end, thereby forming said cut of meat.

3. A method of preparing a cut of meat according to claim 2, comprising the further steps of:
   d. removing at least a portion of a layer of surface fat and surface connective tissue on said lateral surface of said at least a portion of said Subscapularis muscle, and,
   e. removing at least a portion of a layer of surface fat and surface connective tissue on said medial surface from said at least a portion of said Subscapularis muscle.

4. A method of preparing a cut of meat according to claim 2, wherein step (c) comprises the steps of:
   (c1) identifying a groove within said at least a portion of said Subscapularis muscle, and,
   (c2) making a cut from proximate to said prominent white fissure to said ventral end along said groove, thereby forming said cut of meat.

5. A method of preparing a cut of meat, wherein is provided at least a portion of a Subscapularis muscle, and wherein said at least a portion of said Subscapularis muscle has a cranial side, a caudal side, a ventral end, a dorsal end, a medial surface, and a lateral surface, comprising the steps of:
   a. making a longitudinal cut of said at least a portion of said Subscapularis muscle from said ventral end to said dorsal end proximate to an edge of said cranial side, at least a portion of said longitudinal cut being at least approximately parallel to a caudal side edge of said at least a portion of said Subscapularis muscle;
   b. making a cut proximate to said ventral end that is roughly perpendicular to said longitudinal cut of step (a);
   c. making a cut from said dorsal end into said at least a portion of said Subscapularis muscle until a prominent white fissure is at least approximately reached; and,
   d. making a cut from proximate to said prominent white fissure to at least said cut that is proximate to said ventral end and that is roughly perpendicular to said longitudinal cut of step (a), thereby forming said cut of meat.

6. A method of preparing a cut of meat according to claim 5, comprising the further steps of:
   e. removing at least a portion of a layer of surface fat and surface connective tissue on said lateral surface of said at least a portion of said Subscapularis muscle; and,
   f. removing at least a portion of a layer of surface fat and surface connective tissue on said medial surface on said at least a portion of said Subscapularis muscle.

* * * * *